US005613007A

United States Patent [19]

Balga, Jr.

[11] Patent Number: 5,613,007

[45] Date of Patent: Mar. 18, 1997

[54] PORTABLE THERMAL PRINTING APPARATUS INCLUDING A SECURITY DEVICE FOR DETECTING ATTEMPTED UNAUTHORIZED ACCESS

[75] Inventor: John T. Balga, Jr., Stratford, Conn.

[73] Assignee: Pitney Bowes Inc., Stamford, Conn.

[21] Appl. No.: 347,002

[22] Filed: Nov. 30, 1994

[51] Int. Cl.$^6$ .................................................. H04L 9/00

[52] U.S. Cl. .................................................. 380/51; 380/24

[58] Field of Search ......................... 380/24, 51; 364/550

[56] References Cited

U.S. PATENT DOCUMENTS

| | | | |
|---|---|---|---|
| 4,168,533 | 9/1979 | Schwartz . | |
| 4,780,835 | 10/1988 | Sievel et al. | 364/550 |
| 4,802,218 | 1/1989 | Wright et al. . | |
| 4,812,965 | 5/1989 | Taylor | 364/550 |
| 4,813,912 | 3/1989 | Chickneas et al. | 380/51 |
| 4,933,706 | 6/1990 | Abumenhdi . | |
| 4,978,839 | 12/1990 | Chen et al. . | |
| 5,155,693 | 10/1992 | Altmayer et al. | 364/550 |
| 5,227,614 | 7/1993 | Danielson et al. . | |
| 5,390,251 | 2/1995 | Pastor et al. | 380/51 |
| 5,422,954 | 6/1995 | Berson | 380/51 |

FOREIGN PATENT DOCUMENTS

| | | | |
|---|---|---|---|
| 0480749A2 | 4/1992 | European Pat. Off. | G07B 17/00 |

*Primary Examiner*—Salvatore Cangialosi

*Attorney, Agent, or Firm*—Steven J. Shapiro; Melvin J. Scolnick

[57] ABSTRACT

An apparatus for printing on a substrate includes a device for printing indicia on a substrate; a control that controls the indicia printing device, the control including apparatus for establishing a communicating link with an external device, the establishing apparatus including a protocol which utilizes an encryption key, the protocol operable for establishing the communicating link if the encryption key is properly used, the control including apparatus for providing a tampering code as part of the indicia if the encryption key is not properly used.

7 Claims, 3 Drawing Sheets

PORTABLE THERMAL PRINTING APPARATUS INCLUDING A SECURITY DEVICE FOR DETECTING ATTEMPTED UNAUTHORIZED ACCESS

BACKGROUND OF THE INVENTION

This invention is generally concerned with printing apparatus and more particularly with printing apparatus having a security device for detecting attempts at unauthorized access to the printing apparatus.

As shown in U.S. Pat. No. 4,168,533 for a Microcomputerized Miniature Postage Meter, issued Sep. 18, 1979 to Schwartz and assigned to the assignee of the present invention, it is known in the art to provide portable ink jet printing apparatus for applying postage indicia to an envelope for creating a mailpiece. Moreover, as shown in U.S. Pat. No. 4,739,343 for a Thermal Printing System for Postage Meter Mailing Machine Application, issued Apr. 19, 1988 to Dolan and assigned to the assignee of the present invention, it is known in the art to provide printing apparatus which includes a thermal print head for printing alphanumeric and graphic information, including postage indicia, on a substrate which has been treated to be responsive to being brought into contact with the print head. And, as shown in U.S. Pat. No. 4,802,218 for an Automated Transaction System, issued Jan. 31, 1989 to Wright, et. al., it is known in the art to provide portable accounting structure, including a hand held card having embedded therein a microprocessor for storing a predetermined postage value and accounting for dispensing increments of the stored value by associated, non-portable, printing structure.

Other prior art materials of interest, which were found in the course of a search concerning the present invention, include: European Patent Application Publication No. 0 480 749 A1 for a Franking Machine and Method Of Forming Franking Impression, filed Oct. 11, 1991 as Application No. 9 1309379.5 by Alcatel Business Systems and published Apr. 15, 1992; U.S. Pat. No. 4,933,706 for a Franking Machine, issued Jun. 12, 1990 to Abumehdi; U.S. Pat. No. 4,978,839 for a Postage Meter Value Card System, issued Dec. 18, 1990 by Chen, et. al.; and U.S. Pat. No. 5,227,614 for a Core Computer Processor Module and Peripheral Shell Module Assembled To Form A Pocket Size Data Capture Unit, issued Jul. 13, 1993 Danielson, et al.

On the other hand, the prior art appears to be silent regarding the provision of thermal printing apparatus, which includes a security device for easily detecting attempts at unauthorized access to the printing apparatus and for indicating such unauthorized access attempts as part of the printed indicia.

Since enhanced security of postage meters is extremely desirable as discussed in the Government Accounting Office report GAO/GD-94-148 of May 1994 entitled "POSTAGE METERS Risk of Significant Loss But Controls Are Being Strengthened", improved apparatus for detecting attempts at unauthorized access to postage meters is highly desirable. Accordingly, an object of the invention is to provide a security device for a printing apparatus which readily detects attempted unauthorized access to the printing device. Still another object of the invention is to provide a display of such attempts at unauthorized access of the postage meter as part of the printed indicia.

SUMMARY OF THE INVENTION

An apparatus for printing on a substrate includes means for printing an indicia on a substrate; and means for controlling the indicia printing means, the controlling means including means for establishing a communicating link with an external device, the establishing means including a protocol which utilizes an encryption key, the protocol operable for establishing the communications link if the encryption key is properly used, the controlling means including means operable for providing a tampering code as part of the indicia if the encryption key is not properly used.

BRIEF DESCRIPTION OF THE DRAWING

As shown in the drawings, wherein like reference characters designate like or corresponding parts throughout the several views.

DESCRIPTION OF THE PREFERRED EMBODIMENTS

Figure 1:
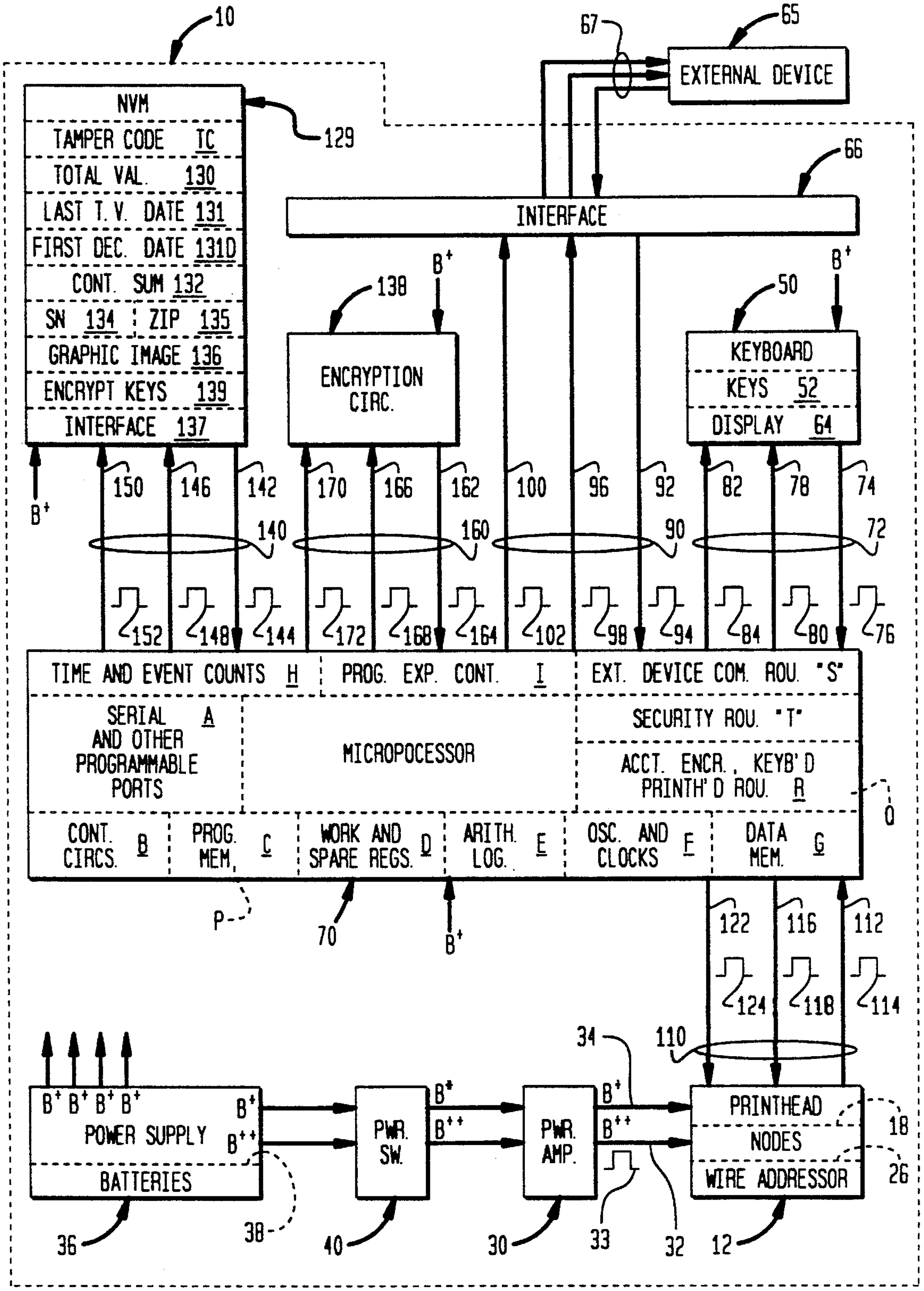
FIG. 1 is a schematic view of apparatus according to the invention.

As shown in FIG. 1, the thermal printing apparatus 10 according to the invention includes a thermal printhead 12. The printhead 12 preferably includes a plurality of first equidistantly parallel spaced wires 14 (FIG. 4), and includes a plurality of second equidistantly spaced wires 16. The second plurality of wires 16 extends substantially perpendicular to the first plurality of wires 14 and are disposed in contact therewith at the intersections thereof. Preferably, the respective wires, 14 and 16, are conventional, low resistance, wires which are insulated from one another except at the intersections thereof, such that each pair of intersecting wires, 14 and 16, forms a node 18 at the intersection thereof which ins thermally responsive to energization of the wires, 14 and 16, forming the node 18. As thus constructed and arranged, the nodes 18 form an array 20 of a plurality of nodes 18 which are each selectively thermally responsive to energization of the respective forming wires, 14 and 16, thereof, whereby a plurality of respectively selected pairs of first and second wires, 14 and 16, may be energized for forming a selected thermal image of energized nodes 18 for printing a corresponding image, such a graphic image 11 (FIG. 5), on an article or any other thermally responsively treated substrate 24, such as a letter 24. The printhead 12 (FIG. 1) also preferably includes a conventional circuit 26 for continuously sequentially addressing each pair of intersecting, node forming, wires, 14 (FIG. 4) and 16, for sequential energization thereof, under the control of the microprocessor 70 (FIG. 1) hereinafter discussed, to reduce the current drain of the printhead 12 in the course of energization thereof. Accordingly, upon energization of the printhead 12, each pair of node forming wires, 14 (FIG. 4) and 16, is energized independently of the remaining node forming pairs of wires, 14 and 16.

For energizing the printhead 12 (FIG. 1) the apparatus 10 preferably includes a conventional power amplifier 30. The power amplifier 30 is suitably electrically connected to the printhead 12 by means of a high power lead 32 (B++) for providing a signal, such as the signal 33, to the printhead 12 for energization of the respective wires, 14 and 15, thereof under the control of the microprocessor 70. In addition, the power amplifier 30 is suitably electrically connected to the printheads 12 by means of a low power lead 34 (B+) for energizing the wire addressing structure 26 of the printhead 12. And, for providing power to the apparatus 10 includes a conventional d.c. power supply 36, including, for example, one or more dry cell batteries 38. Further, to avoid inadvertent energization of the printhead 12, the apparatus 10 preferably includes a conventional, manually actuatable, on-off switch 40, having a sliceable actuating member 41 (FIG. 2), which is suitably connected between the power supply 36 (FIG. 2) and power amplifier 30. As thus constructed and arranged, all of the components of the apparatus 10 other than the printhead 12 are continuously energized for operation thereof, whereas the printhead 12 is operable when the switch actuating member 41 (FIG. 2) is moved to the "on" position and is inoperable when the switch actuating member 41 is moved to the "off" position.

Figure 2:
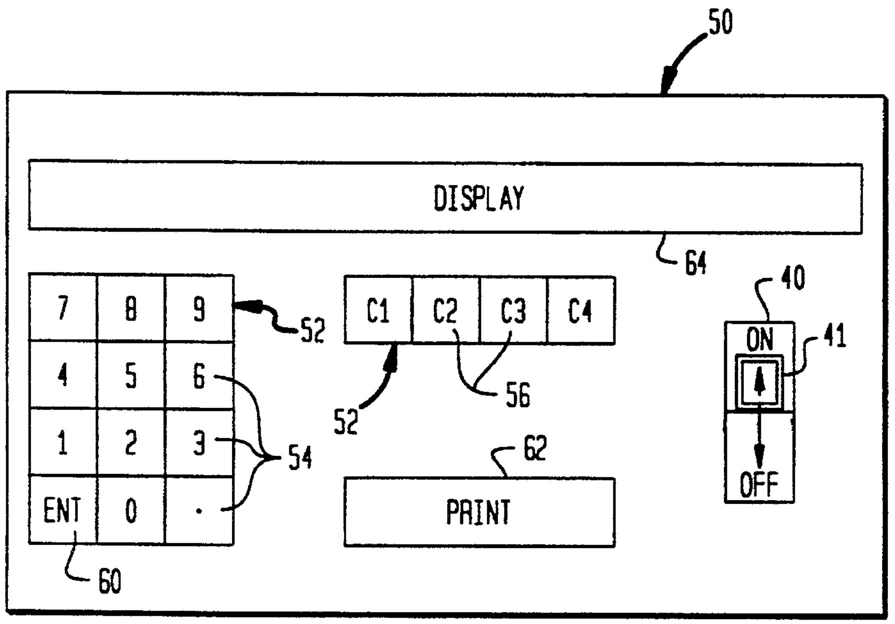
FIG. 2 is an elevation of the apparatus according to the invention.
Figure 3:
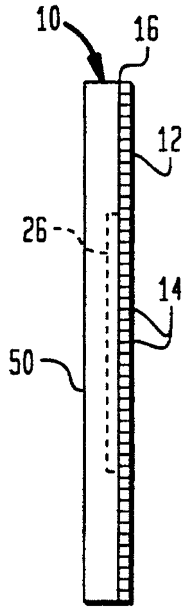
FIG. 3 is a side view of the apparatus of FIG. 2.
Figure 4:
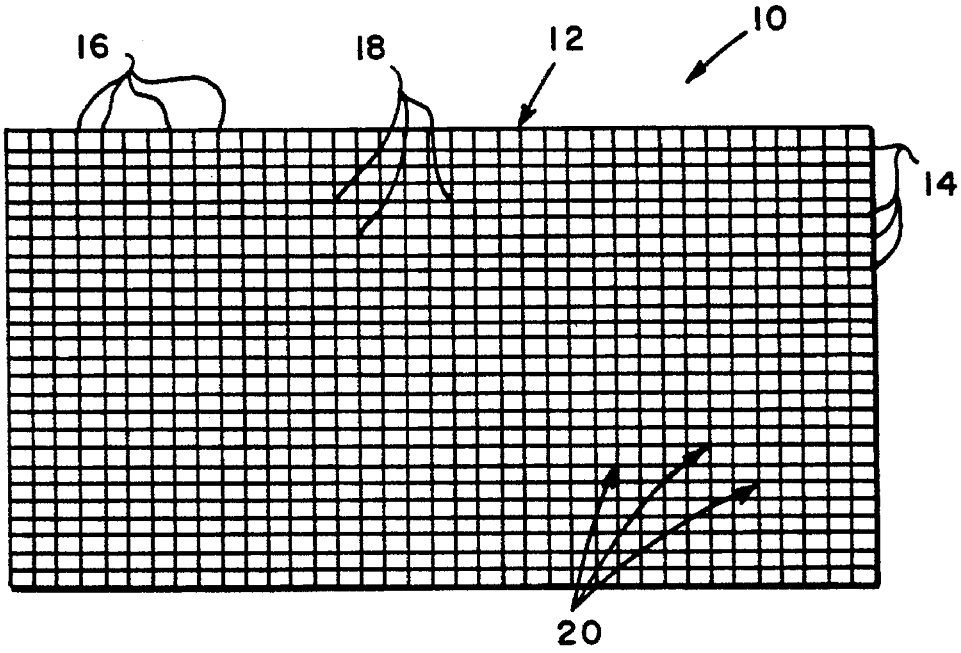
FIG. 4 is a bottom view of the apparatus of FIG. 2, showing the printhead according to the invention.
Figure 5:
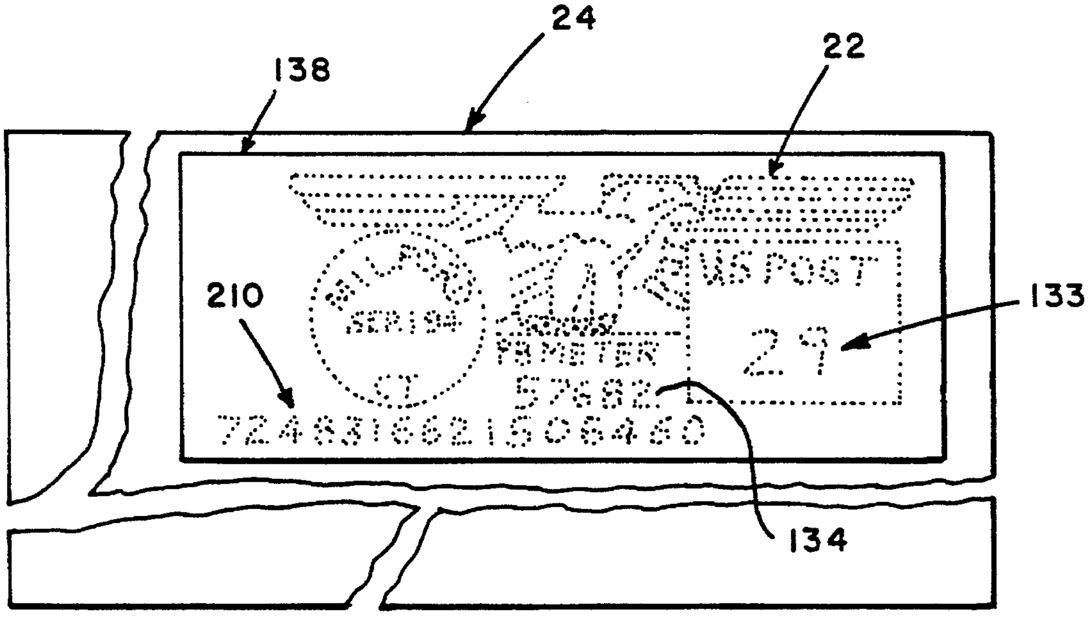
FIG. 5 is a elevation of an envelope, showing a portion thereof which is thermally responsibly treated and having a postage indicia printed thereon by the apparatus of FIG. 2.

The apparatus 10 (FIG. 1) additionally includes a keyboard 50, having a plurality of manually actuatable keys 52 (FIG. 2). According to the invention, the apparatus 10 may be used for numerous applications, including as a device for printing postage or shipping values, or other monetary values, alone of in combination with other information, or as a device for creating a monetary document, including for creating food stamps or vouchers, admission vouchers or traveler's checks, or as any document or other article authenticating device. However, by way of example, and not by way of limitation, the apparatus 10 is hereinafter described for use in a preferred embodiment, that is, as a value metering device which may be used for printing a postage or shipping value, alone or in combination with other information, on a letter or other article, represented by the letter 14 (FIG. 5), which is to be either mailed or shipped. Accordingly, without departing from the spirit and scope of the invention, the keys 52 (FIG. 2) preferably include a plurality of individually manually actuatable numerical value input keys 54, including the ten keys 54 which are marked with the numerals zero (0) through nine (9) inclusive and one key 54 which is marked with a decimal point (.). In addition, the keys 52 preferably include a plurality of class of delivery input keys 56, which are each individually manually actuatable for selecting either a first, second, third or fourth class mode of transportation for delivery of an article 24. (FIG. 5) on which a numerical value is to be printed. Further, the keys 52 (FIG. 2) include an entry key 60, which is manually actuatable for entering data corresponding to the actuation of the selected keys, 54 and 56, into the microprocessor 70 hereinafter described. And, the keys 52 preferably include a print key 62 which is manually actuatable for causing the printhead 12 to be energized under the control of the microprocessor 70. Moreover, the keyboard 50 preferably includes a conventional display 64 for providing the user of the apparatus 10 with visual information corresponding to at least a portion of the image 22 (FIG. 5) which is to be printed by the printhead 12 (FIG. 4).

Preferably, for communicating with suitably equipped external communication structures, represented by the external device 65, the apparatus 10 (FIG. 1) includes conventional interface structure 66, such as a receptacle for receiving a plug for establishing a communications link 67 between the apparatus 10 and external device 65. However, without departing from the spirit and scope of the invention, the interface structure 66 may take the form of a conventional, magnetically encoded, magnetizeable, substrate, which is suitably adapted for insertion in the external structures.

The keyboard 50 (FIG. 1) is preferably conventionally connected to the microprocessor 70, hereinafter described in detail, by means of a serial communications link 72, including a data input lead 74, for providing data signals, such the signal 76, to the microprocessor 70, a data output lead 78, for providing data signals, such as the signal 80, to the keyboard 50, and a clock lead 82, for providing clock signals, such as the signal 84, to the keyboard 50 for synchronizing data communications between the keyboard 50 and microprocessor 70. Further, the interface structure 66 is suitably electrically connected to the microprocessor 70 by means of another serial communications link 90, including a data input lead 92, for providing data signals, such the signal 94, to the microprocessor 70, a data output lead 96, for providing data signals, such as the signal 98, to the interface structure 66, and a clock lead 100, for providing clock signals, such as the signal 102, to the interface structure 66 for synchronizing data communications between the interface structure 66 and microprocessor 70. Moreover, the printhead 12 is suitably electrically connected to the microprocessor 70 by means of yet another serial communications link 110, including a data input lead 112, for providing data signals, such as the signal 118, to the printhead 12, and a clock lead 122, for providing clock signals, such as the signal 123, to the printhead 12 for synchronizing data communications between the printhead 12 and microprocessor 70. The apparatus 10 (FIG. 1) also preferably includes, for use in the value metering application herein described, a conventional non-volatile memory (NVM) 129 for storing data corresponding to critical information, to guard against access by the User and against loss on the occasion of any power failure. Accordingly, the non-volatile memory (NVM) 129 preferably has the capacity for storing a total value 130 which is currently available for printing, the date 131 of storage of the last new total value 130, a control sum 132 corresponding to the sum of the aforesaid currently available total value 130 and the sum of each increment 133 (FIG. 5) thereof which has been accounted for as having been printed by the apparatus 10, the serial number 134 (FIG. 1) of the apparatus 10, the zip code 135 of the user of the apparatus 10, and, optionally, data corresponding to a graphic image 136 of a postage indicia less the current date (FIG. 5) and the current value increment 133. Moreover, the NVM 129 (FIG. 1) preferably includes structure, such as a suitable interface circuit 137, which is conventionally operable under the control of the microprocessor 70 for recalculating the control sum 132, and decrementing the currently available total value 130 by an amount which is equal to the current increment 133 (FIG. 5) of value which is to be printed by the printhead 12, in response to each actuation of the print key 62 (FIG. 2). Further, in a preferred embodiment, the interface circuit 137 is conventionally operable, under the control of the microprocessor 70, for sequentially storing a new first decrementing date 131D for each new total value 130 when the new total value 130 is initially decremented.

As shown in FIG. 1, in the value metering application herein described, wherein security is of importance, the apparatus 10 may, and preferably, includes a suitable encryption circuit 138, which is conventionally operable under the control of the microprocessor 70 for encrypting data corresponding to various numerical values, including, for example, one or more or all of the numerical values stored in the NVM 129, including the total value 130, the last new total value storage or reset date 131, the initial date 131D of decrementing the last new total value 131, the control sum 132, the serial number 134, of the apparatus 10 and the Zip Code 135 of the User; and, as hereinafter discussed, a tampering or other security code "TC". Moreover, assuming the provision of the encryption circuit 138, data corresponding to one or more encryption keys 139 is preferably stored in the NVM 129.

According to the invention, the microprocessor 70 (FIG. 1) may be any commercially available microprocessor having a sufficient number of communications ports "A" which are either already available or are programmable for serial or parallel communications, as the case may be, to provide a separate two-way serial or parallel communications link for each of the components of the apparatus 10 which are to be connected for two-way communication with the microprocessor 70. Of course, the microprocessor 70 may include a plurality of microprocessors 70, to provide additional communication ports 180 and other added capacities which are called for in the particular application. Accordingly, the following discussion concerning the microprocessor 70 applies to each of the microprocessors used in a particular application. The microprocessor 70 generally includes a plurality of control circuits "B:, a program memory "C", a plurality of working and spare registers "D", an arithmetic logic unit "E" and circuits for one or more oscillators and clocks "F", data memory "G", timers and event counters "H" and program expansion control "T".

The microprocessor 70 (FIG. 1) is suitably electrically connected to the non-volatile memory (NVM) 130 by means of a serial communications link 140, including a data input lead 142, for providing data signals, such the signal 144, to the microprocessor 70, a data output lead 146, for providing data signals, such as the signal 148, to the NVM 130, and a clock lead 150, for providing clock signals, such as the signal 152, to the NVM 130, for synchronizing communications between the microprocessor 70 and NVM 130. Moreover, the microprocessor 70 is preferably suitably electrically connected to the encryption circuit 138 by means of a serial communications link 160, including a data input lead 162, for providing data signals, such the signal 164, to the microprocessor 70, a data output lead 166, for providing data signals, such as the signal 168, to the encryption circuit 136, and a clock lead 170, for providing clock signals, such as the signal 172, to the encryption circuit 136 for synchronizing data communications between the encryption circuit 136 and microprocessor 70.

In operation, the User of the apparatus 10 (FIG. 1) commences operation thereof by actuating the power switch 40, that is, moving the switch to its "on" position. At this juncture, the User has two modes of operation of the apparatus 10 available for use of the printing apparatus 10. In one mode of operation, it is assumed that the User knows the value which he or she wishes to select for printing. This would occur, for example, if the apparatus 10 were being used as a postage metering device and the User know the Postal Service's postage requirements for mailing a given article 24, such as a minimum weight, first class, mailpiece. In this mode of operation, the User does not use the class of delivery keys 56. Rather, the User simply manually actuates the appropriate numerical keys 54 corresponding a value to be printed. Whereupon, the microprocessor 70 causes the keyboard display 64 to visually display the value, corresponding to the selected keys 54, to permit the User to verify the selected value before entry thereof. Thereafter, the User actuates the entry key 60, for entering the selected value 133 to be printed, into the microprocessor 70, followed by placing the printhead 12 of the apparatus 10 into contact with the terminally responsive coating 138 on the article 24 on which the selected value 133 is to be printed, and actuating the print key 62 for printing the selected value 133 on the substrate 24. Whereupon, the printhead 50, under the control of the microprocessor 70 energizes the appropriate pairs of wires, 14 and 16, of the printhead 50 for forming a thermal image at the nodes 18 thereof which corresponds to the postage indicia shown in FIG. 5, including the graphic image 22, serial number 134, current date, the selected value 133 and, optionally an encrypted value 210 corresponding to, for example, the serial number 134, control sum 132 an current increment of value 133. In the other mode of operation, wherein the User does not know the selected value to be printed, it is assumed that the User at least knows the right of the article. In this mode of operation the User initially actuates any one of the class of delivery keys 56. In response thereto, the display 64, under the control of the microprocessor 70, visually prompts the User to provide the weight of the article 24. Accordingly, the user follows up actuation of a class of delivery key 56 with actuation of numerical keys 54 corresponding to the weight of the article 24. Whereupon, the keyboard display 64, under the control of the microprocessor 70, visually displays a selected value to be printed, to permit verification the selected value to be printed, to permit verification the selected value by the User. At this juncture, the User can change the displayed value by actuating a different class of delivery key 56. Whereupon the microprocessor 70 recalculates and displays a new selected value. In any event, assuming the User eventually accepts the displayed, selected value, then, as hereinbefore discussed, the User actuates the entry key 60, followed by placing the printhead 12 on the thermally responsive coating 138 of the article 24 which is to be mailed or shipped and then actuating the print key 62 for thermally printing the postage indicia.

When the total value 130 (FIG. 1) available for printing is depleted, or the apparatus 10 becomes inoperable for any other reason, the User may bring the apparatus 10 to he manufacturer from whom the apparatus 10 was obtained, for example, through rental or purchase, or to any other authorized agent of the Postal Service, or to the Postal Service, for repair, for refund of whatever mount of money corresponds to the remainder of the available total value 130 stored in the apparatus 10 or for adding a new total value 130 to the NVM 129. Whereupon the authorized agent or the Postal Service, as the case may be, would connect the interface 66 of the apparatus 10 to a suitable external communicating device for either determining the current total value 130 available for printing, or adding an amount thereto or otherwise resetting the value thereof to a new total value 130. And, assuming a new total value 130 is involved, the external device preferably provides the new total value storage date 131, to ensure that the stored date 131 corresponds to an externally stored date 121.

In a preferred embodiment, the microprocessor 70 preferably includes an external device communicating routine "S" stored therein, which, under the control of the microprocessor 10, utilizes one or more of the encryption keys 139 stored in the NVM 129 in a secure handshake protocol for establishing a communications link with the external device, to ensure that the external communicating device is that of an authorized agent of the Postal Service or the Postal Service. Such a secure handshake could for be accomplished as set forth in U.S. Pat. No. 4,253,158, issued to McFiggins and assigned to the assignee of the instant application and incorporated herein by reference. Moreover, in a second preferred embodiment of the invention, the microprocessor 70 preferably has stored therein a tampering or other security routine "T", which, under the control of the microprocessor 70, causes a tampering code "TC" to be stored in the NVM in response to any unauthorized attempt to access the apparatus 10, for example via the interface 66. In this connection it is noted that the external device communicating routine "S" which is used for establishing a communication link with authorized external devices 65, is preferably a conventional handshake protocol which utilizes one or more of the encryption keys 139. And, the protocol "S" is conventionally operable for establishing the communication link 67 if the encryption key(s) 139 are properly used. Preferably, the protocol "S" is also operable for generating and storing the security code "TC" if the encryption key(s) 139 are not properly used. Thus the security routine "T" may be a sub-routine of the external device communicating routine "S".

For implementing the above operations of the apparatus 10 (FIG. 1) the microprocessor 70 includes a conventional main line program "PB" stored in the program memory "C", and a plurality of conventional routines "Q", including those for operating the NVM 129, encryption circuit 138 keyboard 50 and printhead 12, which are stored in other program memory registers "R". And, the microprocessor 70 is conventionally programmed for implementing the above discussed alternative modes of operation of the apparatus 10. Thus, in the postage metering application herein described, the microprocessor 70 is preferably conventionally programmed for causing the keyboard 50 to display selected values which result from actuation of the numerical keys 54 when the class of delivery keys 56 are not used. Moreover, the microprocessor 70 is conventionally programmed for causing the keyboard 50 to display a prompt advising the User to input a numerical value corresponding to the weight of the article 24 when a class of delivery key 56 is actuated before actuation of a numerical key 54. In addition, the microprocessor 70 is conventionally programmed for the calculating and causing the keyboard 50 to display a selected value when the class of delivery keys 56 are actuated followed by actuation of the numerical keys 54. Still further, the microprocessor 70 is conventionally programmed to enter the selected values 133 into the microprocessor 70 in response to actuation of the entry key 60. Moreover the microprocessor 70 is conventionally programmed for fetching data corresponding to the graphic image 22 of the postage indicia, and current date, and to merge such data with the data corresponding to the selected value 133 and, in response to actuation of the print key 62, energize appropriate nodes 18 of the printhead 12. Further, the microprocessor 70 is conventionally programmed for fetching data corresponding to the control sum 132, serial number 134, zip code 135 and encryption keys 139, and any other information stored in either the microprocessor 70 or the NVM 129, or causing the encryption circuit 138 to encrypt the control sum 139, serial number 134 and zip code 135, and such other information which is desirably included therewith for merging, as encrypted information, with the data corresponding to the graphic and numerical image hereinbefore discussed, for printing the encrypted information 210 with the graphic and numerical image 22, 133, 134. Still further, the microprocessor 70 is conventionally programmed for fetching one of more encryption keys 139, from the NVM 129, and utilizing such keys 139 in the course of implementation of the external device communication routine "S" for implementing a secure handshake protocol with the external device. And, the microprocessor 70 is conventionally programmed for implementing each of the other controlling processes or other functions hereinbefore ascribed thereto in the specification and hereinafter ascribed thereto in the appended claims.

In view of all of the above, it is within the spirit and scope of the invention to provide thermal or non-thermal apparatus 10 (FIG. 1) for printing a postage, or shipping or other authorization value 133 on an article 24 which is to be mailed or shipped. And, to print along with the printed value 133, encrypted information 210 corresponding thereto. Moreover, in a preferred embodiment, the printing apparatus 10 is constructed and arranged for printing, on an article 24 to be mailed or shipped, either or both of human readable or encrypted versions of the postage shipping, or other authorization value 133, serial number 134 and zip code 135, and a security code TC if an unauthorized attempt has been made to communicate with the apparatus 10. For the purposes of this disclosure, any failure in an attempt to establish the communications link 67 with an external device 65 is assumed to be an unauthorized attempt which stems from and is referred to as an improper use of the encryption key(s) 139.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents. For example, while the described embodiment is directed toward a specific thermal printing apparatus including a printhead having a plurality of pairs of first and second intersecting wires which may be thermally energized for forming a thermal image on a substrate, the security device and routines set forth herein could easily be applied to other printing apparatus such as for example, bubble jet and piezo ink jet printers and all such applications are considered within the scope of the appended claims.

What is claimed is:

1. A postage dispensing system comprising:

(a) a postage meter including means for printing an indicia indicative of value on a substrate, means for controlling the indicia printing means and accounting circuitry for storing value available for printing and for decrementing the stored value by the value associated with the printed indicia, and (b) a device external to the postage meter which communicates with the accounting circuitry, via a communicating link, to add incremented value to the stored value;

wherein the controlling means includes means for establishing the communicating link with the device, the establishing means including a protocol which utilizes an encryption key, the controlling means including means operable for causing the printing means to print a tampering code as part of the indicia if a failed attempt to establish the communicating link occurs.

2. A system according to claim 1, wherein the controlling means includes a microprocessor and the establishing means includes an external device communicating routine stored in said microprocessor.

3. A system according to claim 2, wherein the means operable for providing a tampering code includes a non-volatile memory, a security routine stored in said microprocessor, and at times when said encryption key is not properly used said security routine causes said tampering code to be stored in said non-volatile memory for subsequent retrieval and printing as part of the indicia.

4. A system according to claim 1, wherein the indicia includes data corresponding to a zip code, a serial number, a printed value and a date of printing.

5. A system according to claim 4, wherein the data is encrypted.

6. A system according to claim 4, wherein the indicia includes data corresponding to the total value available for printing.

7. A system according to claim 1, wherein the printing means includes a plurality of first parallel spaced wires, a plurality of second parallel spaced wires intersecting the plurality of first parallel spaced wires, each pair of intersecting ones of the plurality of first and second parallel spaced wires forming a node at the intersection thereof, the node being thermally responsive to energization of the first and second intersecting wires forming the node, whereby a plurality of selected pairs of intersecting ones of the plurality of first and second parallel spaced wires are energized by the controlling means to form the indicia at the corresponding nodes formed by the selected ones of the plurality of first and second parallel spaced wires for printing on a thermally responsive treated substrate.

* * * * *